(12) United States Patent
Housni

(10) Patent No.: US 6,795,713 B2
(45) Date of Patent: Sep. 21, 2004

(54) PORTABLE TELEPHONE WITH ATTENUATION FOR SURROUNDING NOISE

(75) Inventor: Jamal Housni, Courbevoie (FR)

(73) Assignee: Sagem SA, Paris (FR)

( * ) Notice: Subject to any disclaimer, the term of this patent is extended or adjusted under 35 U.S.C. 154(b) by 448 days.

(21) Appl. No.: 09/852,685

(22) Filed: May 11, 2001

(65) Prior Publication Data

US 2001/0041583 A1 Nov. 15, 2001

(30) Foreign Application Priority Data

May 11, 2000 (FR) .............................................. 00 06003

(51) Int. Cl.$^7$ .............................................. H04M 1/00
(52) U.S. Cl. .................... 455/550.1; 455/570; 455/296; 381/92; 381/94.7
(58) Field of Search .............................. 455/570, 114.2, 455/278.1, 283, 296, 67.13, 63.1, 575.1, 575.6; 381/122, 355, 356, 42, 44.7

(56) References Cited

U.S. PATENT DOCUMENTS

| | | | |
|---|---|---|---|
| 4,829,565 A | | 5/1989 | Goldberg |
| 5,682,418 A | * | 10/1997 | Ide ........................... 455/575.1 |
| 5,933,506 A | * | 8/1999 | Aoki et al. .................. 381/151 |
| 6,108,415 A | * | 8/2000 | Andrea .................. 379/433.03 |
| 6,118,881 A | * | 9/2000 | Quinlan et al. .............. 381/356 |
| 6,308,074 B1 | * | 10/2001 | Chandra et al. ............. 455/462 |
| 6,470,176 B1 | * | 10/2002 | Mendolia et al. .......... 455/90.1 |
| 6,549,586 B2 | * | 4/2003 | Gustafsson et al. ......... 375/285 |

FOREIGN PATENT DOCUMENTS

| | | |
|---|---|---|
| EP | 0596623 | 5/1994 |
| EP | 0661903 | 7/1995 |

OTHER PUBLICATIONS

Patent Abstracts of Japan vol. 2000, No. 06, Sep. 22, 2000 & JP 2000 069127 A (Matsushita Electric Ind Co Ltd Mar. 3, 2000.

* cited by examiner

*Primary Examiner*—William Trost
*Assistant Examiner*—Marcos L Torres
(74) *Attorney, Agent, or Firm*—Birch, Stewart, Kolasch & Birch, LLP

(57) ABSTRACT

A portable telephone comprises a case fitted with an antenna and pierced with communications openings in one face associated with a speech microphone and with an earpiece. The telephone also has a directional anti-noise microphone connected to the earpiece via an active anti-noise circuit and associated with a first opening that is separate from the communications openings of the speech microphone and of the earpiece.

5 Claims, 1 Drawing Sheet

PORTABLE TELEPHONE WITH ATTENUATION FOR SURROUNDING NOISE

The present invention relates to a portable telephone with attenuation for surrounding noise.

BACKGROUND OF THE INVENTION

Portable appliances are known, in particular headsets, that are fitted with active anti-noise circuits designed to compensate surrounding noise by delivering to the earpiece of the headset a signal that is in phase opposition with a signal representative of surrounding noise. The representative signal is picked up by means of an anti-noise microphone specially dedicated to this function or by means of an extractor filter connected in parallel with the output from a speech microphone associated with the headset. In both cases, the microphone for picking up surrounding noise is disposed in a particular manner that is not transposable to a portable telephone. Also known, in particular from document EP-A-0 661 903, is a portable telephone in which decoupling between surrounding noise and the wanted signal issued by the earpiece is provided by means of a first anti-noise microphone adjacent to the earpiece and a second anti-noise microphone opening out through a face opposite from the earpiece. Such a circuit is complex and expensive.

OBJECTS AND SUMMARY OF THE INVENTION

The invention provides a portable telephone comprising both a case fitted with an antenna and pierced by communications openings in one face associated with a speech microphone and with an earpiece, and an anti-noise microphone connected to the earpiece via an active anti-noise circuit, the anti-noise microphone being associated with at least one opening that is separate from the communications openings of the speech microphone and of the earpiece, and the anti-noise microphone being a directional microphone directed towards the associated opening.

Thus, even when the anti-noise microphone is placed close to the earpiece of the portable telephone, speech signals in the earpiece or speech signals from the user are picked up by the anti-noise microphone with a large amount of attenuation, such that the anti-noise circuit serves to attenuate only ambient noise without attenuating the signals forming part of the conversation, and while using only a single anti-noise microphone.

In an advantageous feature of the invention, the opening associated with the anti-noise microphone opens out through a point of the case that is remote from the antenna. Thus, the slot between the battery block and its housing allows surrounding noise to pass through anywhere along the outlet slot, such that there exists very little risk of this entire slot being covered by the hand of the user.

BRIEF DESCRIPTION OF THE DRAWINGS

Other characteristics and advantages of the invention will appear on reading the following description of a particular and non-limiting embodiment given with reference to the accompanying figures, in which.

MORE DETAILED DESCRIPTION

Figures 1, 2:
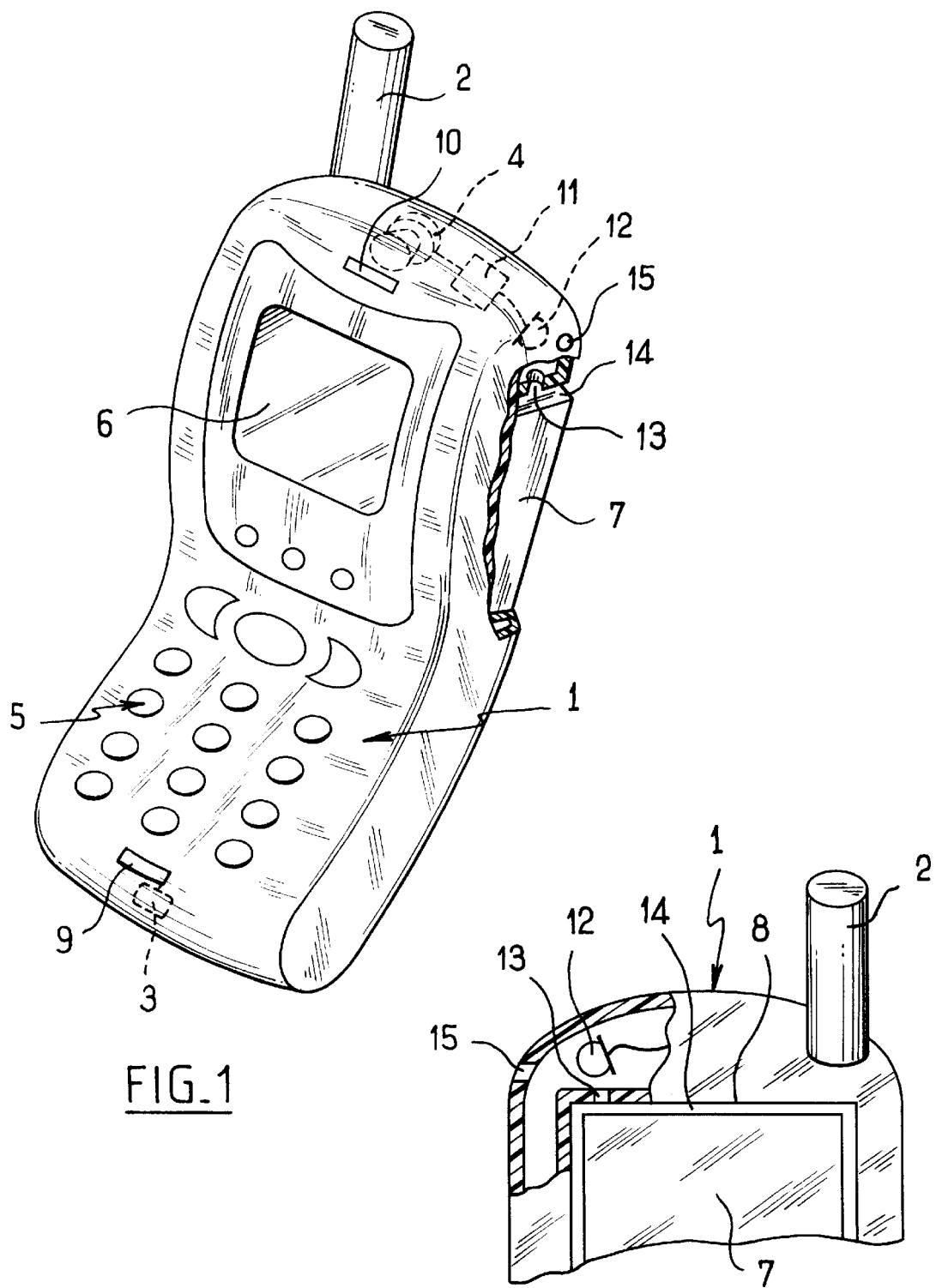
FIG. 1 is a partially cutaway perspective view of a portable telephone of the invention.
FIG. 2 is a partially cutaway fragmentary view of the back of a telephone of the invention.

With reference to the figures, the portable telephone of the invention comprises, in conventional manner, a case 1 fitted with an antenna 2, a speech microphone 3, an earpiece 4, a keypad 5, and a display screen 6 connected to a processor unit (not shown) enabling a call to be set up with a cellular network and powered for this purpose by a battery unit 7 mounted in a housing 8 at the back of the case.

On its front face, the case 1 also has in conventional manner a communications opening 9 associated with the speech microphone 3 and a communications opening 10 associated with the earpiece 4.

Furthermore, the earpiece 4 is connected via an active anti-noise circuit 11 to an anti-noise microphone 12 for picking up surrounding noise.

In the preferred embodiment of the invention, the anti-noise microphone 12 is a directional microphone facing towards an opening 13 made in a wall of the housing 8 for the battery unit 7 adjacent to the earpiece 4, at a point of said wall that is remote from the antenna 2. The opening 13 thus opens out in the rear face of the case 1 via the slot 14 between the battery unit 6 and its housing 8.

In the preferred embodiment as shown, the case also has a second opening 15 associated with the anti-noise microphone 12, and made on the side of the case remote from the antenna 2. Thus, even if the slot 14 is entirely covered by the hand of the user, thereby preventing surrounding noise being picked up by the anti-noise microphone, the opening 15 allows such surrounding noise to be picked up and processed.

Naturally, the invention is not limited to the particular embodiment described and variants can be applied thereto without going beyond the ambit of the invention as defined by the claims.

In particular, although the invention is described with reference to a case having two openings associated with the anti-noise microphone 12, a single opening could be provided, or on the contrary a larger number of openings could be provided to ensure that surrounding noise is picked up whatever the position of the user's hand on the portable telephone.

Although the invention is described with reference to an anti-noise microphone placed inside the case 1, the anti-noise microphone and all or part of the active anti-noise circuit could be located in the battery unit 4 by making an opening therein that opens out into the slot 8. In which case, the opening associated with the anti-noise microphone is preferably formed in the top portion of the battery unit so as to pick up surrounding noise from a point close to the earpiece so that the anti-noise signal issued by the active anti-noise circuit is in phase opposition with the surrounding noise as perceived at the earpiece.

In this respect, it may be observed that the disposition of the opening 13 at a point remote from the antenna 2 while still being adjacent to the earpiece 4 serves to improve the performance of the active anti-noise circuit by avoiding any need for the active anti-noise circuit to process the signals emitted by the antenna 2.

The anti-noise microphone can also be associated with openings that open out directly through the rear face of the case 1.

It is also possible to provide an additional loudspeaker for delivering an active anti-noise signal and providing amplified listening, in particular for hands-free use in an enclosure of small volume such as office or a vehicle.

What is claimed is:

1. A portable telephone comprising both a case fitted with an antenna and pierced by communications openings in one face associated with a speech microphone and with an earpiece, and an anti-noise microphone connected to the earpiece via an active anti-noise circuit, the anti-noise microphone being associated with at least one opening that is separate from the communications openings of the speech microphone and of the earpiece, wherein the anti-noise microphone is a directional microphone directed towards the associated opening.

2. A portable telephone according to claim 1, wherein the opening associated with the anti-noise microphone opens out through a point of the case that is remote from the antenna.

3. A portable telephone according to claim 1, wherein the opening associated with the anti-noise microphone opens out into a housing for a battery unit mounted in the case.

4. A portable telephone according to claim 1, wherein the anti-noise microphone is associated with at least one second opening spaced apart from the first opening.

5. A portable telephone according to claim 4, wherein the second opening opens out through a side of the case remote from the antenna.

* * * * *